US012385857B2

(12) United States Patent
Neuser et al.

(10) Patent No.: US 12,385,857 B2
(45) Date of Patent: Aug. 12, 2025

(54) RAPID HIGH-RESOLUTION COMPUTERIZED TOMOGRAPHY

(71) Applicant: Baker Hughes Holdings LLC, Houston, TX (US)

(72) Inventors: Eberhard Neuser, Wunstorf (DE); Alex Sawatzky, Wunstorf (DE)

(73) Assignee: Baker Hughes Holdings LLC, Houston, TX (US)

( * ) Notice: Subject to any disclaimer, the term of this patent is extended or adjusted under 35 U.S.C. 154(b) by 301 days.

(21) Appl. No.: 17/879,954

(22) Filed: Aug. 3, 2022

(65) Prior Publication Data

US 2024/0044811 A1 Feb. 8, 2024

(51) Int. Cl.
*G01N 23/046* (2018.01)
*G01N 23/083* (2018.01)
*G01N 23/18* (2018.01)

(52) U.S. Cl.
CPC ......... *G01N 23/046* (2013.01); *G01N 23/083* (2013.01); *G01N 23/18* (2013.01); *G01N 2223/3306* (2013.01)

(58) Field of Classification Search
CPC .... G01N 23/046; G01N 23/083; G01N 23/18; G01N 2223/3306
See application file for complete search history.

(56) References Cited

U.S. PATENT DOCUMENTS

| | | | | |
|---|---|---|---|---|
| 5,170,346 A * | 12/1992 | Crawford | ............... | A61B 6/032 378/14 |
| 5,966,422 A * | 10/1999 | Dafni | ................. | A61B 6/482 378/15 |
| 7,016,455 B2 * | 3/2006 | Bruder | ................ | A61B 6/032 378/197 |

(Continued)

FOREIGN PATENT DOCUMENTS

| | | | | |
|---|---|---|---|---|
| EP | 2835631 A1 * | 2/2015 | .......... | G01N 23/046 |
| KR | 20200088222 A | 7/2020 | | |
| WO | 2021177491 A1 | 9/2021 | | |

OTHER PUBLICATIONS

Badea, C.T. et al., "A dual micro-CT system for small animal imaging", 2008, Proc. of SPIE vol. 6913, 691342 (Year: 2008).*

(Continued)

*Primary Examiner* — Blake C Riddick
(74) *Attorney, Agent, or Firm* — Mintz, Levin, Cohn, Ferris, Glovsky and Popeo, P.C.

(57) ABSTRACT

A method for inspecting an object using CT is provided. In an embodiment, the method can include providing an object for an inspection. The object can be provided on a base configured to rotate the object. The method can also include acquiring a first plurality of inspection data characterizing the object during rotation through a first scan sector. The first plurality of inspection data can be acquired by a first inspection chain. The method can further include acquiring a second plurality of inspection data characterizing the object during rotation through a second scan sector. The (Continued)

second plurality of inspection data can be acquired by a second inspection chain. The method can also include providing the first plurality of inspection data and the second plurality of inspection data. Related systems, apparatuses, and non-transitory computer readable mediums are also provided.

20 Claims, 4 Drawing Sheets

(56) References Cited

U.S. PATENT DOCUMENTS

| | | | | |
|---|---|---|---|---|
| 7,092,484 | B1* | 8/2006 | Jensen | B22D 46/00 |
| | | | | 348/42 |
| 7,440,547 | B2* | 10/2008 | Ishiyama | H05G 1/30 |
| | | | | 378/101 |
| 7,473,901 | B2* | 1/2009 | Scholz | A61B 6/4014 |
| | | | | 250/363.08 |
| 2008/0170655 | A1* | 7/2008 | Bendahan | G01V 5/226 |
| | | | | 378/9 |
| 2009/0067575 | A1* | 3/2009 | Seppi | G01V 5/226 |
| | | | | 378/57 |
| 2011/0211671 | A1* | 9/2011 | Chen | G01V 5/00 |
| | | | | 378/53 |
| 2012/0082289 | A1* | 4/2012 | Flohr | A61B 6/541 |
| | | | | 378/8 |
| 2012/0269317 | A1* | 10/2012 | Fritzler | A61B 6/482 |
| | | | | 378/9 |
| 2013/0177130 | A1* | 7/2013 | Konno | A61B 6/08 |
| | | | | 378/4 |
| 2014/0185741 | A1* | 7/2014 | Shen | G01N 23/046 |
| | | | | 378/5 |
| 2014/0193086 | A1* | 7/2014 | Zhang | G06T 5/50 |
| | | | | 382/220 |
| 2014/0301528 | A1* | 10/2014 | La Riviere | G01N 23/2251 |
| | | | | 378/62 |
| 2014/0321603 | A1* | 10/2014 | Taguchi | A61B 6/405 |
| | | | | 378/5 |
| 2015/0094571 | A1* | 4/2015 | Bouhnik | A61B 6/4258 |
| | | | | 600/425 |
| 2015/0103970 | A1* | 4/2015 | Chen | G01N 23/046 |
| | | | | 378/62 |
| 2015/0117593 | A1* | 4/2015 | Ji | A61B 6/5205 |
| | | | | 378/19 |
| 2015/0182179 | A1* | 7/2015 | Edic | A61B 6/4035 |
| | | | | 378/5 |
| 2015/0300963 | A1* | 10/2015 | Haidekker | G06T 11/008 |
| | | | | 382/131 |
| 2015/0356755 | A1* | 12/2015 | Shen | G06T 11/005 |
| | | | | 378/19 |
| 2016/0000396 | A1* | 1/2016 | Taguchi | G06T 5/70 |
| | | | | 382/131 |
| 2016/0166223 | A1* | 6/2016 | Besson | A61B 6/4007 |
| | | | | 378/9 |
| 2016/0219685 | A1* | 7/2016 | Garzon | G01N 23/046 |
| 2016/0223706 | A1* | 8/2016 | Franco | G01V 5/224 |
| 2017/0000437 | A1* | 1/2017 | Zhang | A61B 6/4241 |
| 2017/0042008 | A1* | 2/2017 | Hills | G01V 5/226 |
| 2017/0176351 | A1* | 6/2017 | Chen | G21K 1/02 |
| 2017/0221233 | A1* | 8/2017 | Chen | G06T 11/008 |
| 2017/0276620 | A1* | 9/2017 | Huang | G01N 23/046 |
| 2017/0281105 | A1* | 10/2017 | Basu | A61B 6/4435 |
| 2018/0018796 | A1* | 1/2018 | Chen | A61B 6/4085 |
| 2018/0061097 | A1* | 3/2018 | Yokoi | A61B 6/5205 |
| 2021/0063325 | A1* | 3/2021 | Drenzek | G06T 11/008 |
| 2021/0113164 | A1* | 4/2021 | Wong | A61N 5/1049 |
| 2021/0247331 | A1* | 8/2021 | Zhu | A61B 6/4035 |
| 2022/0381705 | A1* | 12/2022 | Makeev | G01N 23/046 |
| 2023/0132514 | A1* | 5/2023 | Chen | A61B 6/5205 |
| | | | | 382/131 |
| 2024/0016463 | A1* | 1/2024 | Wentland | A61B 6/542 |

OTHER PUBLICATIONS

Fila et al., "Utilization of dual-source X-ray tomography for reduction of scanning time of wooden samples", Journal of Instrumentation, vol. 10, Issue 05, May 2015, 12 pgs.

* cited by examiner

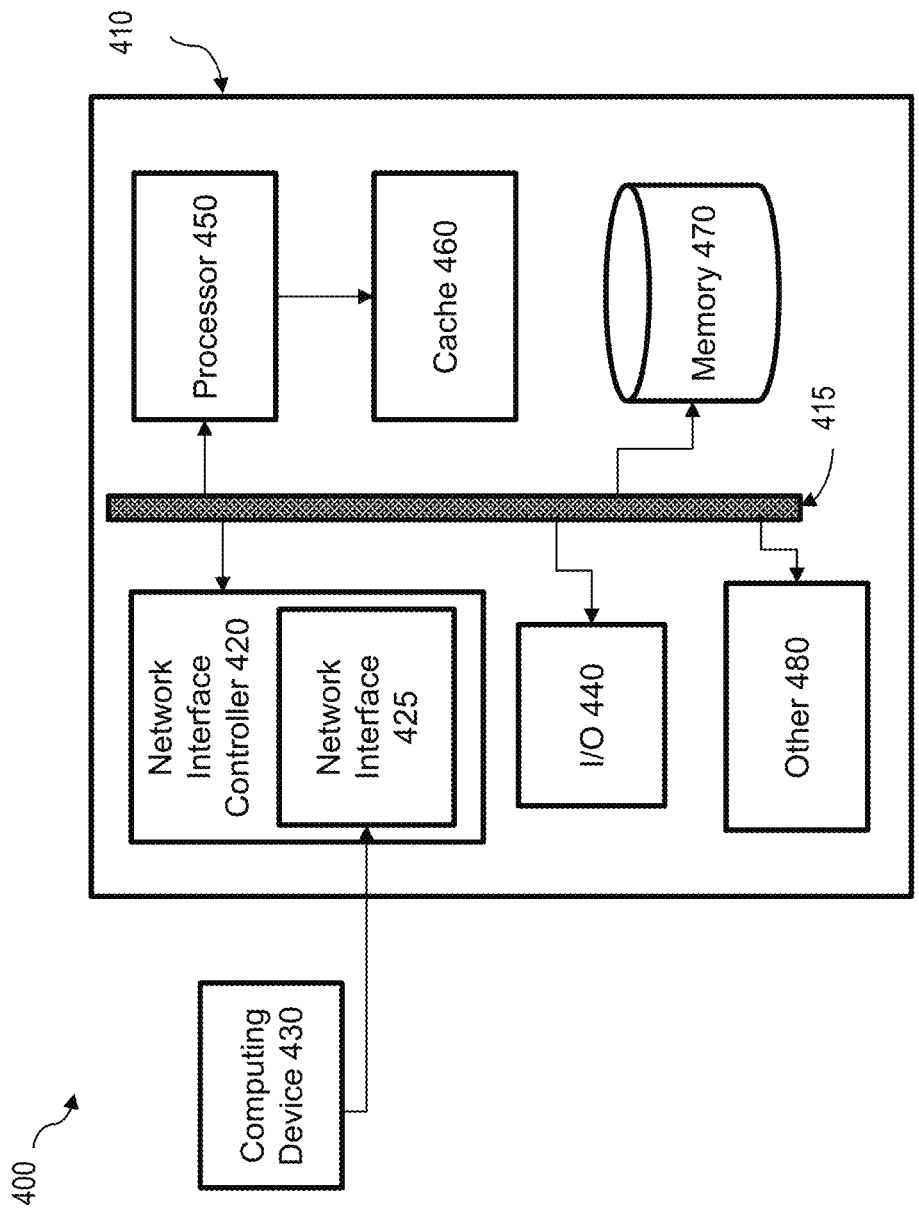

RAPID HIGH-RESOLUTION COMPUTERIZED TOMOGRAPHY

FIELD

The current subject matter relates to methods and systems for inspecting objects using computerized tomography (CT).

BACKGROUND

Object inspection using CT can be performed to assess defects which may be present in the object. CT inspections systems can require complex configurations to ensure that sufficient quantities of CT inspection data are acquired. Often, the quality of reconstruction data generated from the acquired CT inspection data can depend on the amount and quality of the acquired CT data. As a result, the length of inspection times can be long and require data acquisition at multiple inspection configurations. Lengthy inspection times can increase manufacturing costs and product delivery schedules associated with the object being inspected.

SUMMARY

Methods and systems for inspecting an object using CT are provided. Related techniques, and computer-readable mediums are also described.

In one aspect, a method for inspecting an object using CT is provided. In an embodiment, the method can include providing an object for an inspection. The object can be provided on a base configured to rotate the object. The method can also include acquiring a first plurality of inspection data characterizing the object during rotation through a first scan sector. The first plurality of inspection data can be acquired by a first inspection chain. The method can further include acquiring a second plurality of inspection data characterizing the object during rotation through a second scan sector. The second plurality of inspection data can be acquired by a second inspection chain. The method can also include providing the first plurality of inspection data and the second plurality of inspection data.

One or more of the following features can be included in any feasible combination. For example, the first plurality of inspection data and the second plurality of inspection data can be acquired simultaneously. In another example, the first inspection chain and the second inspection chain can each respectively include an X-ray tube and at least one X-ray detector configured in respective association with the X-ray tube. The inspection data can be computed tomography data.

In another example, prior to acquiring additional pluralities of inspection data, the method can include rotating the object an amount equal to a sector partition value. In another example, the sector partition value can be determined based on a total scan range value and a number of inspection chains used to acquire the inspection data during the inspection. In another example, the first plurality of inspection data can be acquired at a first fixed magnification of the first inspection chain and the second plurality of inspection data can be acquired at a second fixed magnification of the second inspection chain. The first fixed magnification can be equal to the second fixed magnification.

In another example, the first plurality of inspection data can be acquired at a first fixed magnification of the first inspection chain and the second plurality of inspection data can be acquired at a second fixed magnification of the second inspection chain. The first fixed magnification can be different from the second fixed magnification. In another example, the first plurality of inspection data can be acquired at a first variable magnification of the first inspection chain and the second plurality of inspection data can be acquired at a second variable magnification of the second inspection chain. The first variable magnification can be equal to the second variable magnification. In another example, the first plurality of inspection data can be acquired at a first variable magnification of the first inspection chain and the second plurality of inspection data can be acquired at a second variable magnification of the second inspection chain. The first variable magnification can be different from the second variable magnification. In another example, the first variable magnification and/or the second variable magnification can be determined based on a type of the object.

In another aspect, a system for inspecting an object using CT is provided. In an embodiment, the system can include a base configured to rotate an object during an inspection. The system can also include a plurality of inspection chains configured with respect to the object. The plurality of inspection chains can include at least one first inspection chain and at least one second inspection chain. The system can further include at least one controller communicably coupled to the base and to the plurality of inspection chains. The system can also include at least one computing device including a display, a memory storing computer executable instructions, and a data processor. The instructions when executed can cause the data processor to perform operations comprising acquiring a first plurality of inspection data characterizing the object during rotation through a first scan sector. The first plurality of inspection data can be acquired by a first inspection chain of the plurality of inspection chains. The instructions can further cause the data processor to perform operations including acquiring a second plurality of inspection data characterizing the object during rotation through a second scan sector. The second plurality of inspection data can be acquired by a second inspection chain of the plurality of inspection chains. The instructions can further cause the data processor to perform operations including providing the first plurality of inspection data and the second plurality of inspection data via the display.

One or more of the following features can be included in any feasible combination. For example, the first plurality of inspection data and the second plurality of inspection data can be acquired simultaneously. In another example, the first inspection chain and the second inspection chain can each respectively include an X-ray tube and at least one X-ray detector configured in respective association with the X-ray tube. The inspection data can be computed tomography data.

In another example, prior to acquiring additional pluralities of inspection data, the method can include rotating the object an amount equal to a sector partition value. In another example, the sector partition value can be determined based on a total scan range value and a number of inspection chains used to acquire the inspection data during the inspection. In another example, the first plurality of inspection data can be acquired at a first fixed magnification of the first inspection chain and the second plurality of inspection data can be acquired at a second fixed magnification of the second inspection chain. The first fixed magnification can be equal to the second fixed magnification.

In another example, the first plurality of inspection data can be acquired at a first fixed magnification of the first inspection chain and the second plurality of inspection data can be acquired at a second fixed magnification of the second inspection chain. The first fixed magnification can be different from the second fixed magnification. In another example, the first plurality of inspection data can be acquired at a first variable magnification of the first inspection chain and the second plurality of inspection data can be acquired at a second variable magnification of the second inspection chain. The first variable magnification can be equal to the second variable magnification. In another example, the first plurality of inspection data can be acquired at a first variable magnification of the first inspection chain and the second plurality of inspection data can be acquired at a second variable magnification of the second inspection chain. The first variable magnification can be different from the second variable magnification. In another example, the first variable magnification and/or the second variable magnification can be determined based on a type of the object.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings:

FIG. 4 is a block diagram of an exemplary computing system in accordance with an illustrative implementation of the system of FIG. 2.

DETAILED DESCRIPTION

Figure 1:
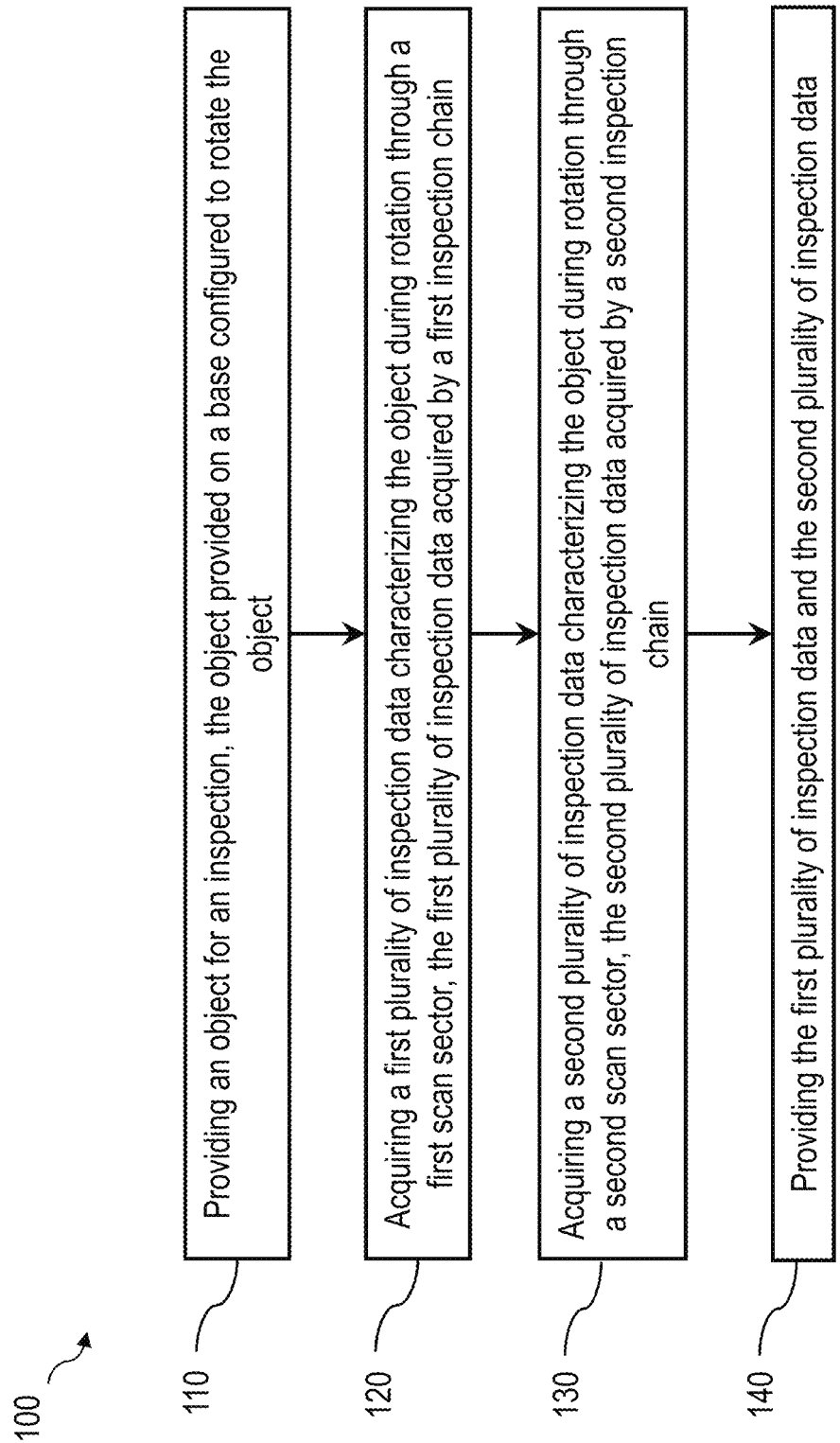
FIG. 1 is a process flow diagram illustrating an example process of some implementations of the current subject matter that can provide for rapid high-resolution object inspection using.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Existing object inspection systems are configured to perform object inspection via CT using a single radiation source emitter, e.g., a tube, and a corresponding, single radiation detector. During object inspections using such legacy systems the object must be rotated a full 360 degrees to acquire a complete scan of the object such that the central axis of the emitted beam is perpendicular to the rotation axis of the object. As a result, object inspection times can be longer to accommodate full rotation of the object. Longer inspection times can cause delays in quality control of manufactured goods, which can critically delay production and sale of high-volume objects such as batteries.

Systems and methods described herein can provide rapid high-resolution inspection of objects using CT. The systems and methods can generate inspection data using multiple imaging (or inspection) chains. Each imaging chain can include a X-ray tube to emitting radiation at a target object and at least one X-ray detector. The configuration and method of performing object inspection using multiple imaging chains as described herein can reduce object inspection time and increase the speed at which image data is acquired. Image data collected simultaneously from multiple image chains can be reconstructed to form a 3D volume of the object under inspection. The reconstruction can be performed using fewer number of projections that can correspond to sector scans less than the full 360 degree rotation of the object. The use of multiple image chains can therefor increase the speed of an object inspection by a factor equal to the number of image chains used and further reduced by a factor equal to the number by which the full 360 degree sector scan is reduced. For example, reducing an object scan sector from a full 360 degrees to 180 degrees (as could be performed using two image chains), the speed of the object inspection can be increased by a factor of 2.

Advantageously, object inspection speed can be increased using the system and methods described herein such that object inspection can be performed completely in-line with object manufacturing. This can reduce time to market for manufacturers of high-priority objects, such as mobile computing device batteries or electric vehicle batteries.

FIG. 1 is a process flow diagram illustrating an example process 100 of some implementations of the current subject matter that can provide for rapid high-resolution object inspection using computerized tomography. At 110, an object can be provided for inspection. In some embodiments, the object can include a battery. The object can be provided on a base of an inspection system. The base can be configured to rotate the object 0-360 degrees.

At 120, a first plurality of inspection data can be acquired. The first inspection data can include computed tomography image data of the object that is acquired by a first inspection chain including a first X-ray tube and at least one first X-ray detector. The plurality of inspection data as described herein can include CT image data of the object that is acquired as the object is rotated through an angle corresponding to a scan sector range. The scan sector range can be equal to a fraction or portion of the full 360 degree scan range. For example, when using two inspection chains, a first scan sector range for scanning using a first inspection chain can be 180 degrees and a second scan sector range for scanning using a second inspection chain can also be 180 degrees. Sector scan ranges less than 180 degrees are contemplated herein, such that the sector scan range for any inspection chain can be small and may include total sector scan ranges that sum to less than 360 degrees. For example, in some embodiments, the sector scan range can be 1-5, 5-10, 10-15, 15-20, 20-25, 25-30, 30-35, 35-40, 45-50, 50-55, 55-60, 60-65, 65-70, 70-75, 75-80, 80-85, 85-90, 90-120, 120-150, or 150-180 degrees.

At 130, a second plurality of inspection data can be acquired. The second inspection data can include computed tomography image data of the object that is acquired by a second inspection chain including a second X-ray tube and at least one second X-ray detector.

The first plurality of inspection data and the second plurality of inspection data can be acquired simultaneously as the object is rotated through a scan range. In some embodiments, prior to acquiring additional inspection data (or after acquisition of the first and second inspection data), the object can be rotated by an amount equal to a sector partition value. In some embodiments, the sector partition value can be determined based on a total scan range value and a number of inspections chains that are used to acquire inspection data.

The inspection chains can be configured to acquire the inspection data at a fixed magnification or a variable magnification. In some embodiments, the fixed magnification can be different between respective inspection chains. In some embodiments, the fixed magnification can be the same among respective inspection chains. In some embodiments, the variable magnification can be the same or different between respective inspection chains. A variable magnification can be a magnification configured to change as the object is rotated through the sector scan range. The magnification can be determined based on the object. For example, inspection data associated with scanning a battery can be acquired using a magnification that is different than the magnification used to acquire inspection data for a wooden or metal object.

At 140, the first plurality of inspection data and the second plurality of inspection data can be provided. For example, a computing device can be coupled to the first inspection chain and the second inspection chain and the first plurality of inspection data and the second plurality of inspection data can be provided to the computing device for storage, display, or data processing. The 2D inspection data can be processed using a reconstruction algorithm to generate a 3D volumetric representation of the object.

Figure 2:
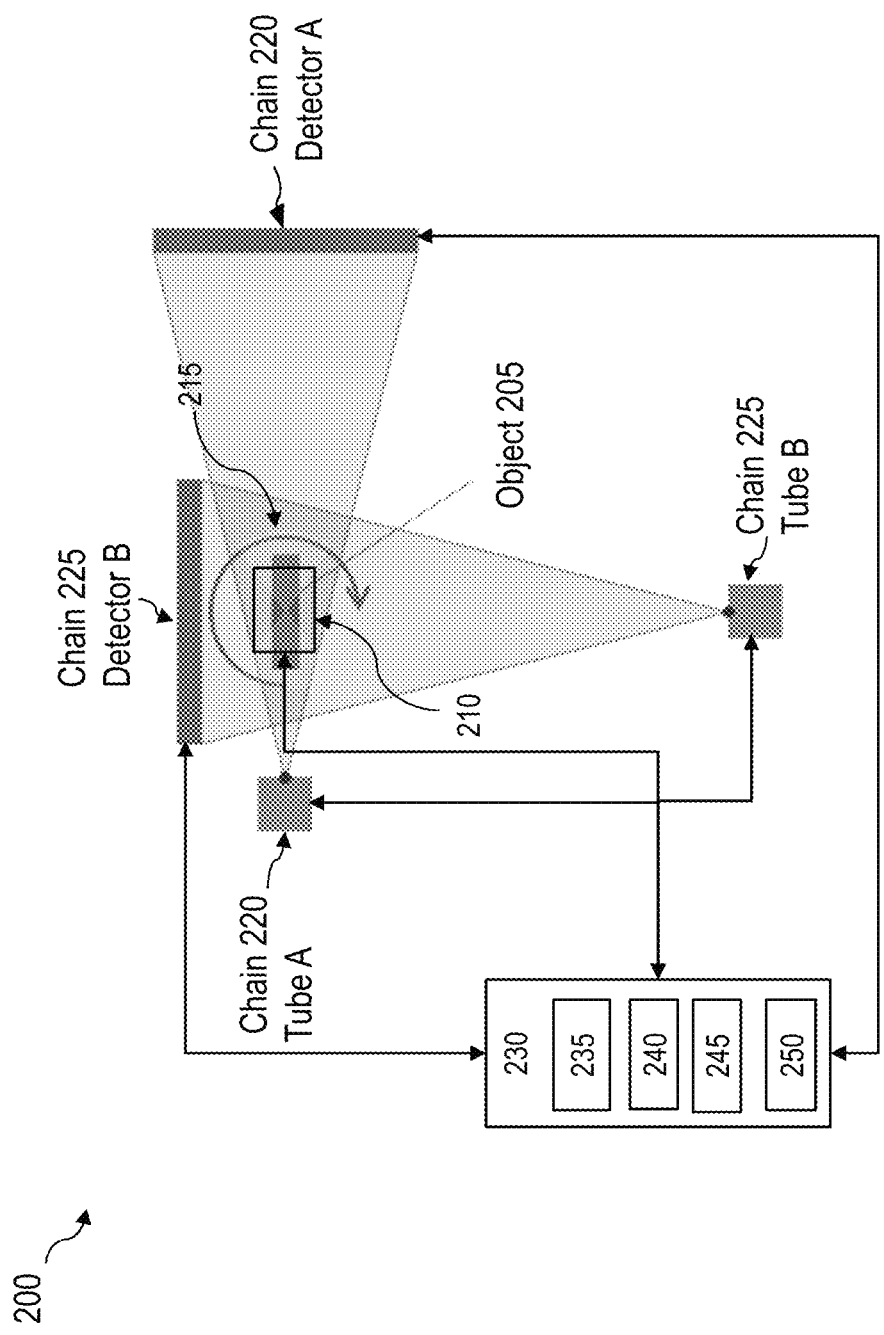
FIG. 2 is a system diagram illustrating an example system of some implementations of the current subject matter that can provide for rapid high-resolution object inspection using.

FIG. 2 is a system diagram illustrating an example system 200 of some implementations of the current subject matter that can provide for rapid high-resolution object inspection using computerized tomography. As shown in FIG. 2, the system 200 can include an object 205 that can be configured on a stage 210. The stage 210 can rotate the object 205 through a sector scan range 215.

As further shown in FIG. 2, the system can include a plurality of inspection chains, such as inspection chain 220 and 225. Each inspection chain can include an X-ray tube and at least one corresponding X-ray detector. For example, inspection chain 220 can include Tube A and Detector A, while inspection chain 225 can include Tube B and Detector B. As the object is rotated through the sector scan range 215, inspection image data can be acquired by inspection chains 220 and 225.

Each of the inspection chains 220 and 225 can be communicatively coupled to a computing device 230. The computing device 230 can include a plurality of communicatively coupled components including, but not limited to, a controller 235, a data processor 240, a memory 245, and a display 250. The controller 235 can be communicatively coupled to the stage 210 and can provide control signals to the stage 210 to control rotation of the object 205 thereon through the sector scan range. The controller 235 can further provide control signals associated with fixed or variable magnification settings for the respective inspection chains 220 and 225. In some embodiments, the controller 235 can be separated physically, but communicatively coupled to, the computing device 230. The memory 245 can store non-transitory computer readable instructions, which when executed by the data processor 240, can perform the method of FIG. 1, as well as operation of the controller 235. The memory 240 can also store one or more reconstruction algorithms configured to generate a 3D volumetric representation of the object 205 based on the acquired inspection data. In some embodiments, the inspection data and/or the generated 3D volumetric representation of the object 205 can be provided via the display 250.

Figure 3:
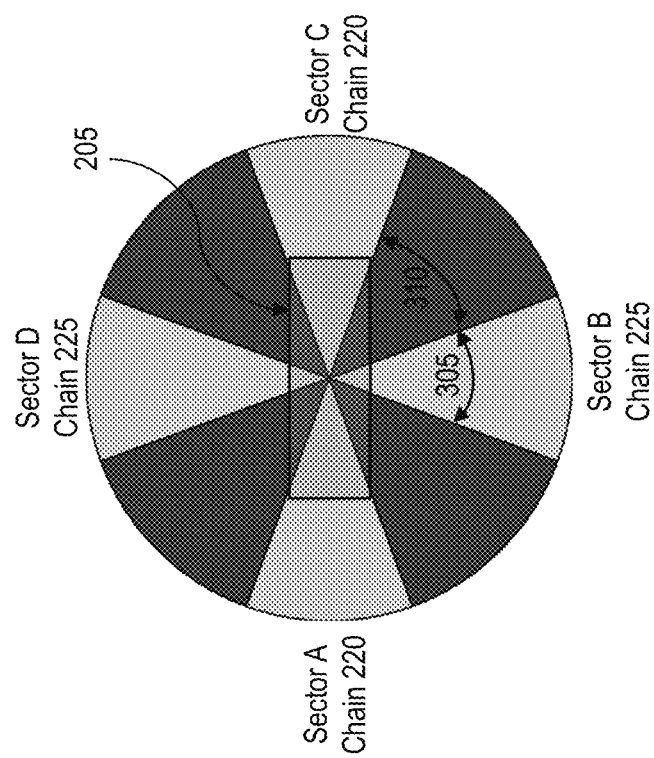
FIG. 3 illustrates a plurality of scan sectors implemented by the system of FIG. 2.

FIG. 3 illustrates a plurality of scan sectors implemented by the system of FIG. 2. As shown in FIG. 3, the system of FIG. 2 can be configured scan the object 205 using the inspection chains 220 and 225 during rotation. In some embodiments, the object 205 can be rotated any angle or amount during data collection or when data collection is not occurring. For example, during data collection, the object 205 can be scanned over a total scan range of 160 degrees using inspection chains 220 and 225. The scan sector range 305 can be 40 degrees and scan be scanned 4 times using inspection chains 220 and 225. For example, inspection chain 220 can scan the object 205 as it rotates through sector A in parallel with inspection chain 225 scanning the object 205 as it rotates through sector B. At end of scanning through sectors A and B, the stage 210 can rapidly rotate the object 205 through the sector partition range 310. In this example, the sector partition range can have a value of 50 degrees. At the completion of rotating the object through the scan partition range 310, the object can be scanned through sector C by inspection chain 220 at the same time as sector D is scanned by inspection chain 225.

FIG. 4 is a block diagram 400 of a computing system 410, such as a computing device, suitable for use in implementing the computerized components described herein, such as a computing device 230 as shown in FIG. 2. In broad overview, the computing system 410 includes at least one processor 450 for performing actions in accordance with instructions, and one or more memory devices 460 and/or 470 for storing instructions and data. The illustrated example computing system 410 includes one or more processors 450 in communication, via a bus 415, with memory 470 and with at least one network interface controller 420 with a network interface 425 for connecting to external devices 430, e.g., a second computing device 230, or a server). The one or more processors 450 are also in communication, via the bus 415, with each other and with any I/O devices at one or more I/O interfaces 440, and any other devices 480. The processor 450 illustrated incorporates, or is directly connected to, cache memory 460. Generally, a processor will execute instructions received from memory. In some embodiments, the computing system 410 can be configured within a cloud computing environment, a virtual or containerized computing environment, and/or a web-based microservices environment.

In more detail, the processor 450 can be any logic circuitry that processes instructions, e.g., instructions fetched from the memory 470 or cache 460. In many embodiments, the processor 450 is an embedded processor, a microprocessor unit or special purpose processor. The computing system 410 can be based on any processor, e.g., suitable digital signal processor (DSP), or set of processors, capable of operating as described herein. In some embodiments, the processor 450 can be a single core or multi-core processor. In some embodiments, the processor 450 can be composed of multiple processors. For example, in some embodiments, a plurality of processors can be communicatively coupled and configured to accelerate one or more image reconstruction algorithms included in the system 200. In some embodiments, the system 200 can include a one or more graphics processing units (GPUs) configured to accelerate one or more image reconstruction algorithms included within the system 200. The image reconstruction algorithms can be configured on the one or more GPUs.

The memory 470 can be any device suitable for storing computer readable data. The memory 470 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing system 410 can have any number of memory devices 470.

The cache memory 460 is generally a form of high-speed computer memory placed in close proximity to the processor 550 for fast read/write times. In some implementations, the cache memory 460 is part of, or on the same chip as, the processor 450.

The network interface controller 420 manages data exchanges via the network interface 425. The network interface controller 420 handles the physical, media access control, and data link layers of the Open Systems Interconnect (OSI) model for network communication. In some implementations, some of the network interface controller's tasks are handled by the processor 450. In some implementations, the network interface controller 420 is part of the processor 450. In some implementations, a computing system 410 has multiple network interface controllers 420. In some implementations, the network interface 425 is a connection point for a physical network link, e.g., an RJ 45 connector. In some implementations, the network interface controller 420 supports wireless network connections and an interface port 425 is a wireless Bluetooth transceiver. Generally, a computing system 410 exchanges data with other network devices 430 via physical or wireless links to a network interface 425. In some implementations, the network interface controller 420 implements a network protocol such as LTE, TCP/IP Ethernet, IEEE 802.11, IEEE 802.16, Bluetooth, or the like.

The other computing devices 430 are connected to the computing system 410 via a network interface port 425. The other computing device 430 can be a peer computing device, a network device, a server, or any other computing device with network functionality. For example, a computing device 430 can be a controller 235, a second computing device 230, or a server. In some embodiments, the computing device 430 can be a network device such as a hub, a bridge, a switch, or a router, connecting the computing system 410 to a data network such as the Internet.

In some uses, the I/O interface 440 supports an input device and/or an output device (not shown). In some uses, the input device and the output device are integrated into the same hardware, e.g., as in a touch screen. In some uses, such as in a server context, there is no I/O interface 440 or the I/O interface 440 is not used. In some uses, additional other components 480 are in communication with the computer system 410, e.g., external devices connected via a universal serial bus (USB).

The other devices 480 can include an I/O interface 440, external serial device ports, and any additional co-processors. For example, a computing system 410 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 410, e.g., a touch screen on a tablet device. In some implementations, a computing device 410 includes an additional device 480 such as a co-processor, e.g., a math co-processor that can assist the processor 450 with high precision or complex calculations.

Exemplary technical effects of the methods, systems, apparatuses, and non-transitory machine readable storage mediums described herein include, by way of non-limiting example, rapidly inspection an object at high-resolution using multiple inspection image chains. This system and method can enable more efficient object inspection and reduced inspection times of objects. As a result, the need for complex, time consuming quality control or defect inspection practices requiring complete scans through 360 degrees of object rotation can be eliminated. Manufacturing and inspection costs of objects, such as batteries, can be reduced.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:
1. A method comprising:
   providing an object for an inspection, the object provided on a base configured to rotate the object;

rotating the object through one or more scanning sectors and one or more non-scanning sectors, wherein a total angle of rotation of the one or more scanning sectors is less than 360 degrees;

acquiring a first plurality of inspection data characterizing the object during rotation through the one or more scanning sectors, the first plurality of inspection data acquired by a first inspection chain;

acquiring a second plurality of inspection data characterizing the object during rotation through the one or more scanning sectors, the second plurality of inspection data acquired by a second inspection chain, wherein no inspection data is acquired during rotation of the object through the one or more non-scanning sectors; and providing the first plurality of inspection data and the second plurality of inspection data.

2. The method of claim 1, wherein the first plurality of inspection data and the second plurality of inspection data are acquired simultaneously.

3. The method of claim 1, wherein the first inspection chain and the second inspection chain each respectively includes an X-ray tube and at least one X-ray detector configured in respective association with the X-ray tube, and wherein the inspection data is computed tomography data.

4. The method of claim 1, wherein the object is rotated through the one or more non-scanning sectors at a rate that is more rapid than a rate at which the object is rotated through the one or more scanning sectors.

5. The method of claim 1, wherein an angle of rotation of each of the one or more non-scanning sectors is determined based on the total angle of rotation of the one or more scanning sectors and a number of inspection chains used to acquire the inspection data during the inspection.

6. The method of claim 1, wherein the first plurality of inspection data is acquired at a first fixed magnification of the first inspection chain and the second plurality of inspection data is acquired at a second fixed magnification of the second inspection chain, the first fixed magnification equal to the second fixed magnification.

7. The method of claim 1, wherein the first plurality of inspection data is acquired at a first fixed magnification of the first inspection chain and the second plurality of inspection data is acquired at a second fixed magnification of the second inspection chain, the first fixed magnification different from the second fixed magnification.

8. The method of claim 1, wherein the first plurality of inspection data is acquired at a first variable magnification of the first inspection chain and the second plurality of inspection data is acquired at a second variable magnification of the second inspection chain, the first variable magnification equal to the second variable magnification.

9. The method of claim 1, wherein the first plurality of inspection data is acquired at a first variable magnification of the first inspection chain and the second plurality of inspection data is acquired at a second variable magnification of the second inspection chain, the first variable magnification different from the second variable magnification.

10. The method of claim 9, wherein the first variable magnification and/or the second variable magnification are determined based on a type of the object.

11. A system comprising:
a base configured to rotate an object during an inspection;
a plurality of inspection chains configured with respect to the object, the plurality of inspection chains including at least one first inspection chain and at least one second inspection chain;
at least one controller communicably coupled to the base and to the plurality of inspection chains; and
at least one computing device including a display, a memory storing computer executable instructions, and a data processor, the instructions when executed cause the data processor to perform operations comprising
rotating the object, via the base, through one or more scanning sectors and one or more non-scanning sectors, wherein a total angle of rotation of the one or more scanning sectors is less than 360 degrees;

acquiring a first plurality of inspection data characterizing the object during rotation through the one or more scanning sectors, the first plurality of inspection data acquired by a first inspection chain of the plurality of inspection chains;

acquiring a second plurality of inspection data characterizing the object during rotation through the one or more scanning sectors, the second plurality of inspection data acquired by a second inspection chain of the plurality of inspection chains, wherein no inspection data is acquired during rotation of the object through the one or more non-scanning sectors; and providing the first plurality of inspection data and the second plurality of inspection data via the display.

12. The system of claim 11, wherein the first plurality of inspection data and the second plurality of inspection data are acquired simultaneously.

13. The system of claim 11, wherein each inspection chain of the plurality of inspection chains respectively includes an X-ray tube and at least X-ray detector configured in respective association with the X-ray tube, and wherein the inspection data is computed tomography data.

14. The system of claim 11, wherein the data processor is configured to control the base to rotate the object through the one or more non-scanning sectors at a rate that is more rapid than a rate at which the object is rotated through the one or more scanning sectors.

15. The system of claim 11, wherein an angle of rotation of each of the one or more non-scanning sectors is determined based on the total angle of rotation of the one or more scanning sectors and a number of inspection chains used to acquire the inspection data during the inspection.

16. The system of claim 11, wherein the first plurality of inspection data is acquired at a first fixed magnification of the first inspection chain and the second plurality of inspection data is acquired at a second fixed magnification of the second inspection chain, the first fixed magnification equal to the second fixed magnification.

17. The system of claim 11, wherein the first plurality of inspection data is acquired at a first fixed magnification of the first inspection chain and the second plurality of inspection data is acquired at a second fixed magnification of the second inspection chain, the first fixed magnification different from the second fixed magnification.

18. The system of claim 11, wherein the first plurality of inspection data is acquired at a first variable magnification of the first inspection chain and the second plurality of inspection data is acquired at a second variable magnification of the second inspection chain, the first variable magnification equal to the second variable magnification.

19. The system of claim 11, wherein the first plurality of inspection data is acquired at a first variable magnification of the first inspection chain and the second plurality of inspection data is acquired at a second variable magnification of the second inspection chain, the first variable magnification different from the second variable magnification.

20. The system of claim 19, wherein the first variable magnification and/or the second variable magnification are determined based on a type of the object.

\* \* \* \* \*